May 12, 1953  C. F. CLAUGHSEY  2,637,944
APPARATUS FOR FORMING GLASSWARE
Filed April 29, 1947

INVENTOR
CHARLES F. CLAUGHSEY
BY Parham & Bates
ATTORNEYS

Patented May 12, 1953

2,637,944

UNITED STATES PATENT OFFICE 2,637,944

APPARATUS FOR FORMING GLASSWARE

Charles F. Claughsey, West Hartford, Conn., assignor to Emhart Manufacturing Company, a corporation of Delaware Application April 29, 1947, Serial No. 744,574

1 Claim. (Cl. 49—38)

This invention relates to apparatus for forming glassware and relates more particularly to a device which may be used to form a charge of molten glass into a hollow parison in preparation for a subsequent operation in which the parison may be formed into a finished glass article.

An object of the present invention is to provide a glass article forming apparatus, having a plurality of movable pressing plungers, the pressing movements of which are individually regulable according to the pressurization of associated pneumatic mechanism of the apparatus by novel valve means.

A further object of the present invention is the provision of unitary valve means for separately regulating the pressure and the flow of fluid to an associated device, the valve means being operated by an air motor which is a component thereof.

Another object of the present invention is to provide an article forming apparatus having a plurality of article forming members to which predetermined vertical movements may be imparted, the lower limit of the movements being determined by positive stop means which may be varied to change the lower limit as may be desired.

Additional objects and advantages of the present device will become apparent and be described in the course of the following disclosure which will be made with reference to the attached drawings, in which.

The present invention is an improvement in glass forming equipment of the type which is designed to receive molten glass mold charges, which may be delivered thereto from an associated glass feeder, and to form the mold charges into hollow glass articles, which are commonly called parisons. Parisons may be formed by a variety of methods and devices, the apparatus of the present invention having inverted pressing plungers which may be thrust upwardly into the glass charges after they are received from the glass feeder and are enclosed within an inverted parison or body mold which has an internal contour suitable for shaping the parison as desired. Disposed adjacent to the lower portion of the parison mold is a neck ring of a preferred configuration which molds the finish portion of the parison and which may be used to transfer the parison after its formation to another molding device in which the parison may be formed into a finished article.

Figure 1:
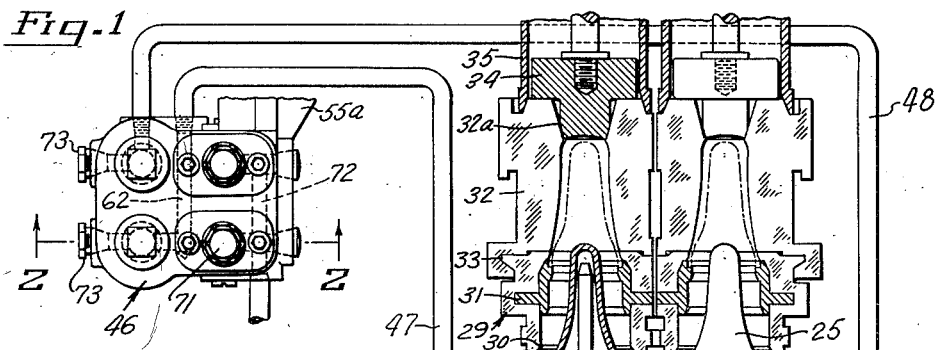
Fig. 1 is a view showing a vertical section of a preferred embodiment of a glass forming apparatus and also showing in plan novel valve means and a plurality of fluid conveying pipe lines associated with the valve means and glass forming apparatus.

As shown in Fig. 1, the main structural element of the present apparatus comprises a housing, generally designated 1, having two vertical bores, generally designated 2 and 3, passing completely therethrough, the bores having various diameters at different levels, the diameters of the two bores, however, being the same at any given level. A housing bottom plate 4 is placed beneath and in apposition to housing 1 and forms a head for bores 2 and 3. A depending threaded rod 5 may be formed integrally with bottom plate 4 for cooperative engagement with a threaded aperture of a bevel gear 6 which is centralized and supported by a stationary hollow pedestal 7 resting on a base surface 8 which may be a supporting surface of a glass forming machine. An adjusting rod 9 may be provided with gear teeth at one end, as at 10, for engagement with gear 6, the adjusting rod being pivotally supported at 11 in a portion of pedestal 7. By turning rod 9, bevel gear 6 may be rotated thereby raising and lowering housing 1 and associated apparatus which will be described presently. Conventional means, as at 1a, may be provided in conjunction with a stationary mounting plate 1b to aid in guiding and positioning housing 1 during the vertical adjustment thereof.

In view of the similar nature of bores 2 and 3, the following disclosure will refer, whenever possible, to bore 2 alone, although it should be understood that the mechanism associated with both bores is substantially the same.

Bore 2 is formed to define two coaxial aligned cylinders 12 and 13, respectively, which are separated by a section 14 of the bore, having a relatively reduced diameter, within which is positioned a guide bushing 15. A piston rod 16 is slideably retained by bushing 15 and is concentrically positioned within bore 2. Secured to piston rod 16 are upper and lower pistons 17 and 18, respectively, the pistons being slideably retained within cylinders 13 and 12, respectively. Retainer bushings 19 and 19a may be provided at the upper end of bore 13 and may be clamped in position by housing 1, the retainer bushings forming a head to cap off the upper end of bore 13. A floating bushing 20, carrying resilient packing rings 21 on its inside diameter and packing ring 22 on its outside diameter, is retained by bushings 19 and 19a. Floating bushing 20 acts as a yieldable bearing member which because of the packing rings 21 permits slight lateral displacement of and aids in guiding piston rod 16 during its vertical movements and, in conjunction with the packing rings, forms a tight seal to prevent leakage of compressed fluid between bore 13 and adjacent portions of the apparatus.

Piston rod 16 may be provided with threads on its upper end, as at 23, and a plunger coupling guide 24 may be engaged therewith, the plunger guide having spanner wrench slots 24a to facilitate its assembly with the piston rod. Threadedly secured to plunger guide 24 and movable therewith is a hollow plunger tip 25. The plunger guide is slideably retained within a guide bushing 26 which is secured within the enlarged upper end of bore 2, indicated at 27. Bushing 26 may have an external conically shaped annular face 28 to aid in the positioning of a neck ring, generally designated 29, which may be provided with a conical seating face 30 for cooperation with face 28. Neck ring 29 may carry a thimble 31 which, in conjunction with the neck ring, molds the finish portion of a hollow glass article which is formed within a parison or body mold 32 which is positioned on and engages neck ring 29, as indicated at 33. Parison mold 32 may be provided with an aperture 32a through which a molten glass mold charge may pass in charging the present apparatus preparatory to a pressing operation by means of which the parison is formed. A bottom plate or baffle 34 may be centralized within aperture 32a to complete the mold for forming the glass parison. A charge guiding means of any conventional type may be provided at the upper end of the parison mold, as at 35, to aid in directing the mold charges thereto.

The present device may be used to press a pair of molten glass mold charges into parisons, the charges being fed simultaneously from an associated glass feeder (not shown) downwardly through the respective apertures into the parison molds. After the delivery of the mold charges to the parison molds, the baffle or bottom plates may be positioned above the parison molds, thereby forming completely enclosed mold cavities into which the mold charges may be pressed by an upward movement of the plunger tips. At the time the mold charges are fed to the parison molds, the plunger tips are in their most downwardly retracted position, as shown by solid lines in Fig. 1. The mold charges may form themselves over the tips of the plungers and may gradually move downwardly over the plungers by gravity. While so positioned, the mold charges will not be in good heat transferring contact with the walls of the parison mold since a film of air will exist between the outside surfaces of the mold charges and the internal surfaces of the parison molds and neck rings. Upward movement may be imparted to the plunger tips by suitable pressurization of the cylinders that are associated with the respective plunger tips. As the plunger tips move upwardly, the mold charges will be carried into contact with the internal surfaces of the parison molds and will be pressed into molding contact therewith, the plunger tips forming the internal surfaces of the parisons formed by the pressing operation. During the latter portion of the upward movement of the plungers, glass will be forced downwardly into molding contact with the internal surfaces of the neck rings and thimbles. The uppermost position of the pressing plungers is determined by the formation of the parisons as shown by phantom lines in Fig. 1.

After the completion of the pressing operation, the plungers are moved downwardly by suitable pressurization of the associated pneumatic mechanism, the plungers coming to rest at their lowermost charge receiving positions, as determined by solid washers, such as 24b, concentrically positioned about the piston rods adjacent to the plunger guides. During the downward movement of the plungers, compressed air, sometimes called "puff air," may be fed into the parison molds by means of a flow channel 25a to which compressed air may be fed by an associated pipe 25b. The "puff air" tends to overcome any vacuum that may be caused by the retraction of the plunger tips from the parisons and also is instrumental in maintaining the formed parisons in contact with the internal surfaces of the parison mold. Under certain conditions, the "puff air" may even tend to expand the parisons more completely against the molding faces of the parison molds.

Solid washers, such as 24b, of various thicknesses may be placed about the piston rods to limit the lowermost position of the plunger tips at various levels in accordance with the size and shape of the parisons that are being formed.

It is noteworthy that the mold charges receive little differential cooling by means of localized contact with internal surfaces of the parison molds. The principal heat transfer from the glass to the parison molds takes place uniformly during the pressing operation in which the parisons are formed. This uniformity of cooling is instrumental in avoiding certain defects both of the parisons and the finished articles formed subsequently therefrom.

During the pressing operation, the plunger tips are in excellent heat-transferring contact with the glass of the mold charges and thus are subjected to heating in this period. In order to cool plunger tip 25, an axial hole 36 is formed in piston rod 16, running throughout its length, and communicates with a nozzle 37 which may be used to direct cooling fluid to the interior of the plunger tip. A feed tube 38 may be concentrically positioned within hole 36 and may be secured at its lower end to bottom plate 4, the bottom of the tube being plugged in any conventional manner, as at 39. The tube remains stationary at all times, piston rod 16 moving relative thereto and forming in effect a conventional telescopic construction. Conventional packing 40 may be provided between feed tube 38 and piston rod 16 to prevent leakage from hole 36 to the lower end of bore 12. Coolant may be introduced to tube 38 by means of a channel 41, formed in bottom plate 4, the channel being supplied with fluid under pressure by means of pipe line 42 in which is provided a regulating valve 43. By a suitable adjustment of the regulating valve, a predetermined quantity of cooling fluid, such as air or water, may be fed to the plunger tip associated with piston rod 16.

Spent fluid may drain from the interior of the plunger tip by way of a plurality of channels 44 provided in plunger guide 24. Spent fluid may drain therefrom to a collecting annulus 44a from which the fluid may be drained by means of a channel 45.

It has been found desirable in the operation of the present device to supply cooling fluid continuously to the interiors of the plunger tips, although it should be understood that such a mode of operation is by way of preference rather than of limitation, intermittent cooling also being possible with suitable conventional modifications of the disclosed structure.

The manner of cooling the plunger tips has been described primarily with reference to plunger tip 25 although it should be noted that similar apparatus operating in a similar fashion is provided in conjunction with the other plunger tip of the disclosed apparatus. Differential cooling of the two plunger tips to suit individually different requirements thus is provided for.

Novel valve means, generally designated 46, has been provided by the present invention to regulate the pressure and the flow of compressed fluid to cylinders of the forming apparatus in order to impart raising and pressing movements to the plunger tips. Pipe lines 47 and 48 may be provided to convey the compressed fluid from the valve means to associated fluid flow channels 49 and 50, respectively. Channel 49 conveys the compressed fluid to the lowermost regions of cylinders 12 and 13 of bore 2, whereas channel 50 conveys compressed fluid to the corresponding regions of the corresponding cylinders of bore 3. A timer 51 of any conventional type may be provided to regulate the flow of compressed fluid at predetermined times to an associated pipe line 52 by means of which the fluid is conveyed to internal flow channels 53, 54 and 54a formed within housing 1. It is to be noted that these channels convey compressed fluid to the uppermost regions of cylinders 12 and 13 of bore 2 and the corresponding cylinders of bore 3 simultaneously in order to impart lowering movements to the plunger tips.

Inasmuch as it is not feasible to construct an apparatus of the character described having a plurality of movable members operating with substantially identical frictional restraints, it is desirable to provide individual pressure regulation of the fluid actuating each of the movable members. Thus, if the pressure of the fluid flowing to each such member is regulated proportionate to the friction or drag acting on the member, concurrent movements of the plurality of moving members may be assured.

In view of the foregoing, individual regulation of the pressure of the fluid flowing to the respective cylinders associated with each of the pressing plungers has been provided by the present invention to assure concurrent raising movements thereof, and to assure that both parisons will be completed at the same time. Return of the plungers thereafter to their lowermost positions is effected by compressed fluid which, under the control of a timer 51, flows through lines 52 and 53 and through ports 54 and 54a into the cylinders of the apparatus to effect downward movement of the plungers.

Figure 2:
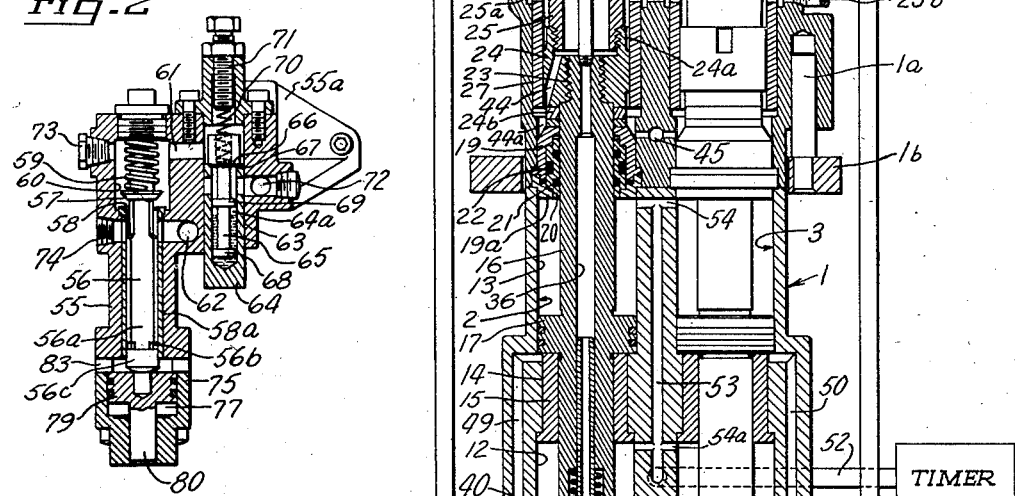
Fig. 2 is a vertical section view taken on line 2—2 of Fig. 1, showing certain features of the novel valve means which regulates the pressure and flow of fluid to predetermined portions of the associated glass forming apparatus.

Novel valve means 46 comprises a valve housing 55 which may be attached to the mounting face of a portion of the glass making machine by means of a mounting bracket 55a (see Fig. 2). As indicated in the plan view of the valve structure (Fig. 1), housing 55 incorporates a pair of flow regulating valves and a pair of pressure regulating valves, one of each of which has been shown in Fig. 2 and will be described with reference thereto. The flow regulating valve comprises a conventional spring loaded tappet valve member 56 having a conical face 57 for seating on a cooperating face 58 formed on the upper end of a valve insert 58a which is secured in housing 55. The spring load on the valve 56 is exerted by a coiled compression spring 59 retained in place in a conventional manner. When valve member 56 is raised, air may flow from an air chamber 60, which is supplied with compressed air from a passage 61, to an outlet passage 62 which communicates with associated pipe line 47.

Tappet valve member 56 has longitudinal flutes, as at 56a, communicating with a groove 56b formed in a lower portion of the valve member adjacent to a cylindrical portion 56c. When the valve member is in its lowermost position, fluid may exhaust from passage 62 and pipe line 47 to the atmosphere by way of the flutes and groove 56b. When the valve member is raised, cylindrical portion 56c is moved into the valve insert 58a and prevents exhausting of fluid to the atmosphere.

In a portion of valve housing 55 adjacent to valve member 56, a bore 63 is formed, the axis of which is parallel to the axis of the tappet valve member. Within bore 63 is positioned a check valve insert 64, the valve insert having an oil filled internal chamber 64a within which a check valve member 65 is operatively disposed. The check valve member has a conically faced head 66 which is formed to cooperate with a conical face 67 which is formed on the upper end of the valve insert. Two disc-like enlargements 68 and 69 are provided on a lower portion of the check valve member, the lowermost enlargement 68 being submerged by the pool of oil within the internal chamber 64a. As the check valve member 65 moves vertically, disc-like enlargement 68, moving within the pool of oil, creates a dashpot effect to damp out any spurious oscillations of the check valve member.

A spring 70 is positioned above check valve member 65 and yieldably resists upward movements thereof, the spring force acting on the check valve being regulated by the setting of an adjusting screw 71 operatively positioned above the spring. The above described check valve construction may be used to regulate the pressure of fluid flowing to passage 61 from an inlet passage 72 which may be supplied from any suitable source of compressed fluid.

If desirable, conventional means, as at 73, may be used to introduce a suitable lubricant to the valve. A pressure gauge or similar device may be attached at 74 to indicate the fluid pressure in the associated outlet passage.

Thus, the valve shown in Figs. 1 and 2 affords a regulation, not only of the pressure, but also of the flow of fluid supplied to the various cylinders of the associated apparatus in order to impart raising movements to the respective pressing plungers.

Figure 3:
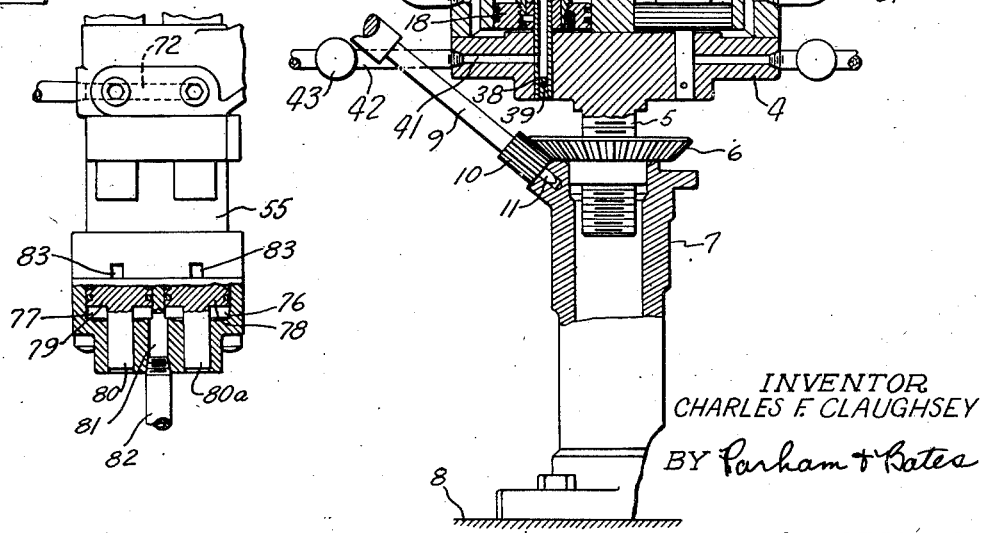
Fig. 3 is an elevation view of the lower portion of the valve means, a part of which is broken away to reveal the internal construction thereof.

To actuate the tappet valve members of the flow regulating valve, an air motor assembly is provided at the lower end of valve housing 55 (see Figs. 2 and 3). The air motor assembly comprises a cylinder housing 75 which is formed to define two adjacent bores 76 and 77 in which piston members 78 and 79, respectively, are slideably retained. Each piston member has formed integrally therewith a depending rod, as shown in Fig. 3, rods 80a and 80 being associated with pistons 78 and 79, respectively. A fluid pressure channel 81 communicates with bores 76 and 77 and conveys fluid thereto from pipe line 82 to which compressed fluid may be admitted at predetermined times by any conventional fluid regulating apparatus. The pressurization of bores 76 and 77 raises the pistons retained therein, the raising movements thereof being imparted to the associated tappet valve members, such as member 56. Vent holes 83 may be provided in valve housing 55 to vent the upper portions of bores 76 and 77 to the atmosphere at all times. When the fluid pressure is released from bores 76 and 77, pistons 78 and 79 will be forced downwardly by the associated spring loaded tappet valve members.

Having thus described a working embodiment of the present invention and a practical application in the glass field, I claim:

In a glassware pressing apparatus, a plurality of spaced parallel pressing plungers, individual fluid actuating motors for advancing and retracting the plungers, means for concurrently supplying operating pressure fluid to said motors to retract said plungers in a first direction, individual valves for supplying fluid to each of said motors to advance said plungers in the opposite direction and hold said plungers in pressing positions, said valves regulating the flow of pressure fluid to each motor, means for simultaneously actuating said valves to thereby concurrently initiate advancement of said plungers, separate pressure regulating valve means for individually regulating the pressure of the fluid supplied to advance and hold each of said plungers in its pressing position, and individual means for preselecting the adjustment of the pressure regulating valves.

CHARLES F. CLAUGHSEY.

References Cited in the file of this patent

UNITED STATES PATENTS

| Number | Name | Date |
| --- | --- | --- |
| 818,411 | Bush | Apr. 24, 1906 |
| 1,558,789 | Carrey | Oct. 27, 1925 |
| 1,694,486 | Nixon | Dec. 11, 1928 |
| 1,843,159 | Ingle | Feb. 2, 1932 |
| 1,911,119 | Ingle | May 23, 1933 |
| 1,986,766 | Smith | Jan. 1, 1935 |
| 1,995,653 | Rowe | Mar. 26, 1935 |
| 1,998,336 | Soubier | Apr. 16, 1935 |
| 2,011,980 | Miller | Aug. 20, 1935 |
| 2,218,839 | Armstrong | Oct. 22, 1940 |
| 2,357,501 | Carnahan | Sept. 5, 1944 |
| 2,508,891 | Rowe | May 23, 1950 |

FOREIGN PATENTS

| Number | Country | Date |
| --- | --- | --- |
| 118,117 | Australia | Feb. 24, 1944 |